(No Model.)

C. O. WEBB.
MACHINE FOR PEARLING BARLEY, WHEAT, &c.

No. 347,540. Patented Aug. 17, 1886.

Witnesses.
H. W. Elmore
Fred. V. Fischer

Inventor.
Cyrus O. Webb
By his Attorney
John C. Pennie

UNITED STATES PATENT OFFICE.

CYRUS O. WEBB, OF MORAVIA, NEW YORK.

MACHINE FOR PEARLING BARLEY, WHEAT, &c.

SPECIFICATION forming part of Letters Patent No. 347,540, dated August 17, 1886.

Application filed August 25, 1885. Serial No. 175,263. (No model.)

*To all whom it may concern:*

Be it known that I, CYRUS O. WEBB, a citizen of the United States, residing at Moravia, in the county of Cayuga and State of New York, have invented certain new and useful Improvements in Machines for Pearling Barley, Wheat, and the Like; and I do hereby declare the following to be a full, clear, and exact description of the invention, such as will enable others skilled in the art to which it appertains to make and use the same.

My invention relates to certain new and useful improvements in machines for pearling barley, wheat, and the like; and it consists in the novel construction and arrangement of parts hereinafter described, and particularly pointed out in the claim forming a part of this specification.

Figure 1:
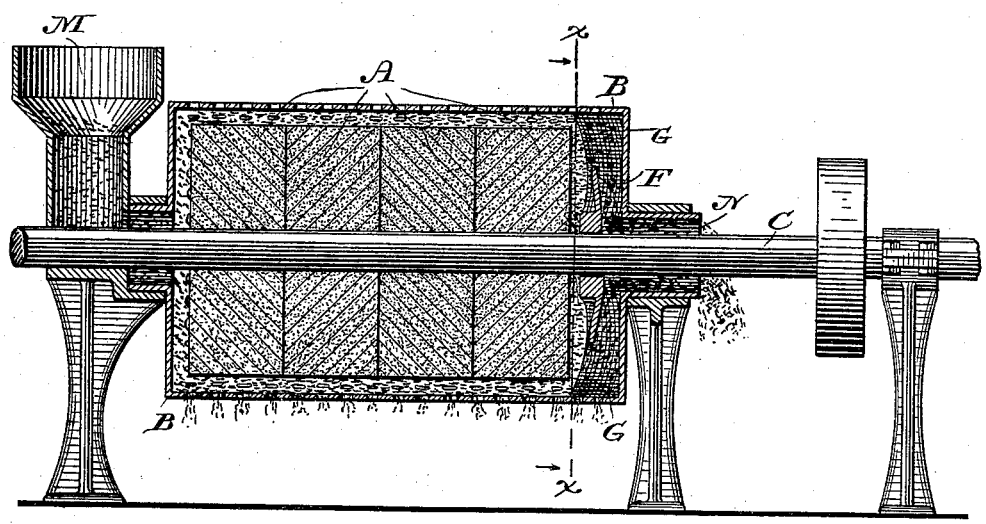
Figure 2:
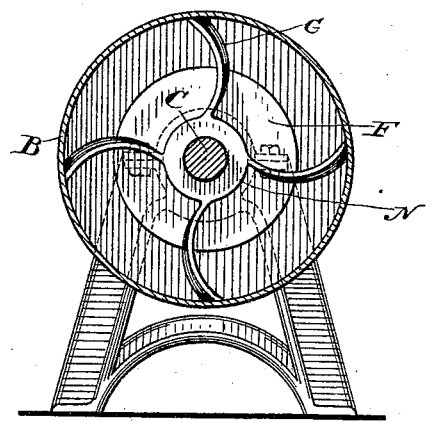

Referring to the drawings, and to the letters of reference marked thereon, Figure 1 represents a central longitudinal section of my improved machine. Fig. 2 represents a cross-section of the same taken upon the line $x\ x$ of Fig. 1.

In the drawings, A indicates a series of emery-wheels mounted upon a shaft, C, which is given a motion of rotation from suitable gearing. The emery-wheels are contained within an outer casing or cylinder, B, covered with perforated sheet-iron, the casing being mounted independently of the shaft and adapted to revolve by friction of the grain between the emery-wheels and its own interior surface, as will be hereinafter more fully explained.

At the discharge end of the casing is located the disk F, rigidly attached to the said casing by lifting-arms G, hereinafter referred to, and only revolving when the casing revolves. Between this disk and the casing end extend a series of lifting-arms, G, with intermediate spaces forming passages for the discharge of the grain through the exit-opening N. Instead of the curved shape shown in the drawings, these lifting-arms may be straight or otherwise, although I prefer the form shown, for the reason that it increases the facility of discharge.

The operation of the machine is as follows: The grain being admitted at one end of the casing through the entrance-opening M, and the shaft C being caused to rotate, the friction of the grain against the interior of the casing causes the latter to revolve in its bearings. As this action continues the grain passes along toward the discharge end of the casing, and during its passage is thoroughly pearled without liability of being crushed or ground by excess of pressure. When it reaches the discharge end of the casing, it is taken up by the scoop-like lifters G and emptied out through the discharge-opening N. By this arrangement and construction it is evident that no discharge will take place unless the casing revolves, and consequently the grain will be retained within the casing until thoroughly acted upon.

Having thus described my invention, what I claim, and desire to secure by Letters Patent, is—

A machine for pearling barley, wheat, and the like, consisting of a revolving shaft, emery-wheels mounted thereon, a casing exterior to the emery-wheels and adapted to revolve by friction of the grain between the said wheels and its interior surface, said casing being provided at its discharge end with lifting-arms for the discharge of the grain when the casing revolves, substantially as described.

In testimony whereof I affix my signature in presence of two witnesses.

CYRUS O. WEBB.

Witnesses:
 AUSTIN E. DANIELS,
 CORNELIUS B. WAY.